Nov. 4, 1952
F. T. SILA
2,616,575
VEHICLE WHEEL MOUNTED DERRICK
Filed Dec. 28, 1951
2 SHEETS—SHEET 1
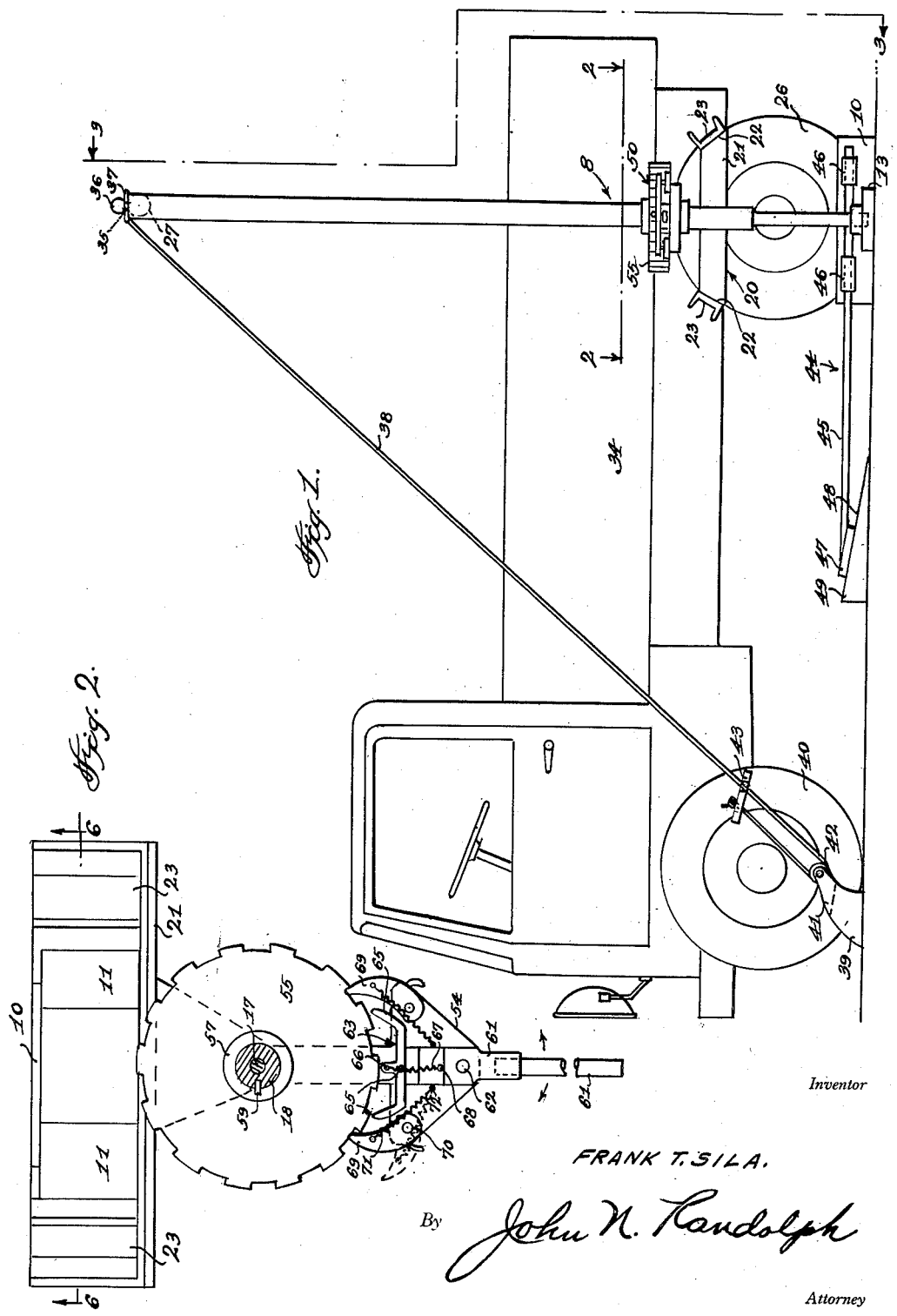
Inventor
FRANK T. SILA.
By John N. Randolph
Attorney Nov. 4, 1952　　　　　　　F. T. SILA　　　　　　　2,616,575
VEHICLE WHEEL MOUNTED DERRICK
Filed Dec. 28, 1951　　　　　　　　　　　　　　　2 SHEETS—SHEET 2
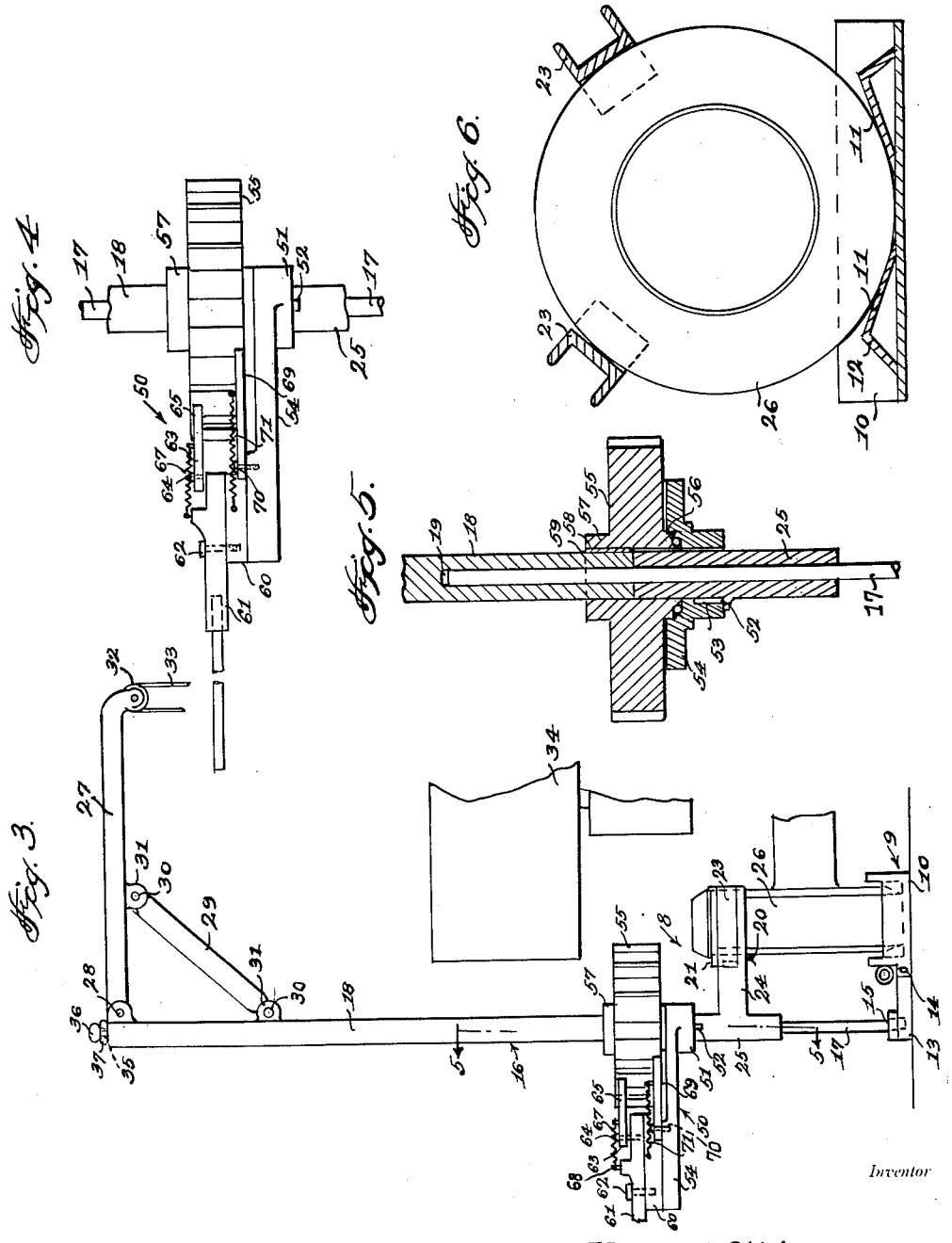
Inventor
FRANK T. SILA.
By　John N. Randolph
Attorney Patented Nov. 4, 1952

2,616,575

UNITED STATES PATENT OFFICE 2,616,575

VEHICLE WHEEL MOUNTED DERRICK

Frank T. Sila, Benton Harbor, Mich.

Application December 28, 1951, Serial No. 263,938

10 Claims. (Cl. 214—38)

This invention relates to a novel construction of derrick for use in raising, lowering and moving heavy loads onto or off of a wheeled vehicle and more particularly has reference to a derrick which may be readily secured in an operative position by engagement with a vehicle wheel.

More particularly, it is an object of the present invention to provide a derrick of extremely simple construction which may be readily dismantled, folded and stored in an automobile trunk when not in use yet which is capable of being quickly and easily assembled and engaged with a vehicle wheel and held thereby in a stationary position while loads are raised, lowered or moved thereby onto or off of the vehicle.

Another object of the invention is to provide a derrick wherein the weight of the load supported thereby will assist in maintaining the derrick secured to the vehicle wheel and in tight clamping engagement therewith.

Still a furthr object of the invention is to provide a derrick including a mast having a rotatable upper section and manually actuated means for turning said upper section of the mast to swing a load supported thereby.

Various other objects and advantages of the invention will hereinafter become more fully apparent from the following description of the drawings, illustrating a presently preferred embodiment thereof, and wherein:

Figure 1 is a side elevational view showing the portable derrick in an operative position applied to a truck wheel;

Figure 2 is an enlarged horizontal sectional view taken substantially along a plane as indicated by the line 2—2 of Figure 1 showing the device removed from the truck;

Figure 3 is an elevational view taken at right angles to Figure 1 along a plane substantially as indicated by the line 3—3 of Figure 1;

Figure 4 is a fragmentary elevational view of a portion of the derrick;

Figure 5 is a vertical sectional view taken substantially along a plane as indicated by the line 5—5 of Figure 3, and Figure 6 is a vertical sectional view taken substantially along a plane as indicated by the line 6—6 of Figure 2.

Referring more specifically to the drawings, the wheel derrick in its entirety is designated generally 8 and includes a dual wheel chock, designated generally 9 having an elongated channel-shaped body portion 10 which is provided with longitudinally spaced inclined plates having correspondingly inclined surfaces 11 which extend upwardly and away from one another from the base or bottom of the channel member 10, the adjacent ends of which are longitudinally spaced from one another. Each of the plates is also provided with a downwardly and outwardly inclined outer surface portion 12 forming a ramp. The lower, remote ends of the surface portions 11 and 12 of the plate may be secured in any manner to the upper surface of the bottom of the channel member 10. A relatively wide bar 13 is hinged or pivoted at one end thereof, as seen at 14 in Figure 3, to one side of the channel member 10 adjacent its bottom surface and intermediate to its ends and said bar 13 projects laterally from said side and is pivotally or hingedly mounted for swinging movement in a vertical plane. The bar 13 is provided at its outer end with an upstanding boss forming an upwardly opening socket 15.

The derrick 8 includes a mast, designated generally 16 including a lower section formed by a relatively large rod or post 17 the lower end of which is detachably seated in the socket 15 and projects upwardly from the bar 13. The upper portion 18 of the mast 16 is of substantially larger diameter than the rod or post 17 and is preferably solid except for a relatively long longitudinally extending recess or socket 19 which opens outwardly of the lower end thereof and which receives the upper end of the post 17.

A wheel saddle or clamp 20 includes a bar 21 having obliquely disposed ends 22 to each of which is secured a tire engaging member 23. The tire engaging members 23 are preferably channel-shaped in cross section and are arcuately bowed from end-to-end thereof with the inner base portions thereof being concave on the inner sides of said members 23. The members 23 are suitably secured to the ends 22 of the bar 21 and project transversely therefrom and are inclined in opposite directions relatively to one another, as seen in Figure 1. An arm 24 is formed integral with and suitably secured to the bar 21 intermediate of its ends and projects transversely therefrom in the opposite direction to the members 23. A sleeve 25 is preferably formed integral with the opposite end of the arm 24 and is disposed transversely thereof.

In the initial stages of assembly of the derrick 8, the channel member 10 is placed on the ground in longitudinal alignment with a vehicle wheel 26, usually a rear wheel of the vehicle, either to the front or to the rear thereof. The vehicle is then driven so that its wheel 26 will move toward the adjacent end of the dual chock 9 into one end of the channel member 10 and up the ramp surface 12 disposed adjacent thereto. Further movement of the wheel 26 will cause it to assume a position between and in engagement with the two inclined surfaces 11 which will function as a dual chock for resisting rolling movement of the wheel 26 relatively to the member 10 in either direction. Ordinarily, the wheel 26 will be of the pneumatic type so that a portion of the tread of the tire will engage the chock surfaces 11 and the portion of the channel member 10 disposed therebetween and it will be readily apparent that the chock surfaces 11 may be spaced different distances apart depending upon the diameter of the wheel and tire and that chock surfaces spaced any given distance apart will effectively function for tires of different outer diameters. With the wheel 26 thus held by the chock 9, the bar 13 will rest on the ground and extend outwardly from said wheel. The bar 13 is hinged at 14 so that it will have a firm support on the ground even though the ground or other supporting surface is not exactly level. The saddle members 23 are then positioned to engage the tread portion of the tire or wheel 26, spaced from and on either side of the top portion thereof, as illustrated in Figure 6, and with the portions 24 and 25 extending outwardly from the wheel. Prior to applying the uppermost section 18, as previously described, the post 17 is inserted downwardly through the sleeve 25 into the socket 15, so that the unit 23, 24, 25 is supported on the post 17 by the saddle members 23 engaging across the tread of the tire 26. The mast 18 is then applied, as previously described and as illustrated in Figures 1, 3 and 5. It will be readily apparent that the weight of the mast 18 will bear upon the upper end of the sleeve 25 to displace said sleeve, the arm 24 and the wheel saddle 20 downwardly. Accordingly, it will thus be seen that the weight of the mast section 18 will thus be borne by the saddle portions 23 engaging the tread portion of the wheel or tire 26 so that said portions 23 will effectively clamp the tire or wheel between the saddle 20 and the chock 9 to avoid any tendency of the wheel turning or rolling.

A spar or boom 27 is pivotally connected at 28 at one end thereof to the upper end of the mast section 18 for vertical swinging movement relatively thereto and is normally supported at substantially a right angle to the mast section 18 by a brace 29. The brace 29 is disposed diagonally between the mast section 18 and boom 27 and is connected at its ends by pins 30 to ears 31 which project transversely from the section 18 and boom 27. The boom 27 has an outer downturned free end in which is journaled a pulley or sheave 32 over which can be trained a rope or cable 33.

The structure as previously described, assembled as illustrated in Figures 1 and 3 and as heretofore described, may effectively function as a demountable derrick for loading and unloading a truck 34 of which the wheel 26 forms a part. The mast section 18 may be turned on the post 17 so that the boom 27 will project away from an end or side of the truck 34. One end of the cable or flexible member 33 may then be attached to a load to be lifted into the truck 34 and by exerting a pull on the opposite end of the cable 33 the load may be elevated and the mast section 18 revolved to swing the outer end of the boom 27 over the truck body so that the load may then be lowered onto the truck body. If desired, a small winch may be utilized for elevating the load or the cable 33 may be trained over a block and tackle, not shown. Similarly, the derrick 8 may be employed for unloading the truck 34. The derrick 8 may also be attached to a wheel of an automobile for loading or unloading the top thereof with heavy items such as small boats. It will also be readily apparent that the derrick 8 may be quickly and easily dismantled for storage, as for example in an automobile trunk, by lifting the mast section 18 off of the post 17, removing one of the pins 30 and permitting the boom 27 to fold against the mast section 18. The saddle 20 and the parts formed integral therewith may then be lifted off of the post 17 and said post removed from the socket 15. The wheel 26 is then driven off of the base 10 so that all of these parts may be stored individually in the vehicle trunk.

For the purpose of handling heavier loads, the mast section 18 is provided at its upper end with a stem 35 which terminates in a knob or head 36 which is turnably engaged by an eye 37 provided on one end of a rope or cable 38. A hook-shaped member 39 is detachably fitted around the lower forward part of the front vehicle wheel or tire 40 which is disposed in alignment with the wheel 26, engaged by the base 10 and saddle 20. Said hook-shaped member 39 is provided at one side or end thereof with a shank portion 41 which extends upwardly and rearwardly along the outer side of the wheel 40 and which has a pulley 42 journaled in its free end around which a portion of the rope or cable 38 is trained. The opposite end of the rope or cable 38 extends through and is knotted beyond one opening of a friction tightener 43 of a conventional type having a second opening extending perpendicularly therethrough through which a portion of the cable or flexible member 38, between the eye 37 and pulley 42 extends, so that when the tightener 43 is rocked to an oblique position relatively to the cable 38, as seen in Figure 1, said cable portion will bind in the last mentioned opening. The rope or cable 38 thus functions as a guy rope or brace to prevent the mast 16 from swinging to the right from its position of Figure 1 when the boom 27 is swung to the right of its position of Figure 1 for elevating a load onto the rear end of the truck 34 or for lowering a load therefrom.

In the event that the vehicle 34 is disposed on a hill or sloping surface, the chock 10 may be additionally maintained in a set position by means of the unit 44 as illustrated in Figure 1, including a rod 45 one end of which engages detachably in a pair of aligned sleeves 46 which are secured to the outer side of the outer side wall of the chock 10 above the level of the bar 13. The rod 45 may be inserted in the sleeves 46 from either end thereof and so that its opposite end will extend in a downhill direction. Said opposite end is provided with a foot member or plate 47 which is secured thereto and disposed at a slight angle to the axis of the rod 45 and which seats on the upper inclined surface 48 of a wedge block 49 and is displaceable upwardly along said surface 48 until the foot member 47 is disposed in frictional engagement therewith.

A pawl and ratchet unit 50 may be provided for turning the mast 18 on the sleeve 25 and includes a collar 51 which may be permanently secured to the upper portion of the sleeve 25 or detachably mounted thereon and keyed thereto by a key member 52 which engages in a key groove 53 of the collar 51. A supporting arm 54 projects radially from the collar 51 in the opposite direction to the arm 24. If desired, the collar 51 may be omitted and the arm 54 formed integral with the sleeve 25 above the arm 24.

A ratchet wheel 55 is turnably disposed on the upper end of the sleeve 25 above the collar 51 and is preferably supported for rotation relatively to said collar by an anti-friction thrust bearing 56. The upper portion of the hub 57 of the ratchet wheel 55 extends above the upper end of the sleeve 25 and is provided with a keyway 58 to receive a key 59 provided on the lower end of the mast section 18 for keying said mast section to the ratchet wheel 55.

The arm 54 is provided on its upper side and adjacent its outer end with an upstanding longitudinally extending, centrally disposed rib 60 which is spaced from side edges of the arm 54 and is disposed outwardly of the ratchet wheel 55. An actuating lever 61 is pivotally supported adjacent one end thereof by a pivot pin 62 on the rib 60. A double pawl 63 is pivotally mounted intermediate of its ends by a pivot pin 64 on the upper side of the inner end of the lever 61 and has corresponding pawl ends 65 either of which may be disposed to engage the ratchet wheel teeth. Pawl 63 has an arm 66 projecting from its intermediate portion toward the ratchet wheel 55, as seen in Figure 2, to which is anchored one end of a contractile spring 67 the opposite end of which is anchored to the lever 61 as seen at 68 to normally extend directly over the pivot 64.

A pair of corresponding holding pawls 69 are pivotally mounted by pivot pins 70 on the arm 54, one on either side of the rib 60 and project outwardly therefrom for selectively engaging the teeth of the ratchet wheel 55. A contractile spring 71 is anchored to the upper side of each pawl 69 adjacent its free end and has its opposite end anchored at 72 to the adjacent side of the rib 60. The springs 71 form over center springs which are disposed between the pivots 70 and the ratchet wheel 55 when the pawls 69 are in operative positions. Pawls 69 may be individually swung outwardly on their pivots 70 so that the springs 71 will swing across the pivots 70 to thereafter urge the pawls 69 away from the ratchet wheel 55 rather than into engagement therewith.

Assuming that it is desired to turn the ratchet wheel 55 counterclockwise as seen in Figure 2, for swinging the mast section 18 and boom 27 in the same direction, the lever 61 is swung counterclockwise on its pivot 62 and the double pawl 63 is rocked in the same direction so that its right-hand end 65 will engage against one of the teeth of the ratchet wheel 55. With the left-hand pawl 65 swung back to an inoperative position and the right-hand holding pawl 69 in its operative position of Figure 2, the lever 61 is then swung clockwise on its pivot 62 causing the right-hand pawl end 65 to turn the ratchet wheel 55 counterclockwise and while the right-hand holding pawl 69 rides over a tooth of the ratchet wheel. This operation can be repeated for turning the ratchet wheel 55 in a step-by-step motion and the over center spring 67 will hold the right-hand pawl end 65 in an operative position and allow it to yield and ride over a ratchet wheel tooth each time that the handle 61 is swung back or counterclockwise on its pivot 62. By merely reversing the previously described procedure, the ratchet wheel 55 may be turned in the opposite direction. Both holding pawls 69 may be simultaneously disposed in engaged positions, as seen in Figure 2, for retaining the ratchet wheel 55, mast section 18 and boom 27 in any desired position.

Various modifications and changes are contemplated and may obviously be resorted to, without departing from the spirit of scope of the invention as hereinafter defined by the appended claims.

I claim as my invention:

1. A wheel mounted derrick comprising a dual chock adapted to engage under a vehicle wheel, a bar projecting outwardly from one side of said dual chock away from the vehicle wheel, a post detachably connected to said bar extending upwardly therefrom, a wheel saddle having spaced portions engaging on said vehicle wheel on either side of and adjacent the topmost portion thereof, said saddle including a portion extending across a part of the outer side of the wheel, an arm projecting outwardly from said last mentioned saddle portion, a sleeve fixed to the outer end of said arm and supported thereby in an upright position, said sleeve being slidably mounted on the post, a second post of larger diameter than the first mentioned post having a downwardly opening socket receiving the upper end of the first mentioned post, the lower end of said second post resting upon the upper end of the sleeve and being supported thereby for rotation relatively to the sleeve and first mentioned post, a boom connected to and projecting laterally from the upper end of the second post, a pulley journalled in the outer free end of said boom, and a flexible member trained over said pulley.

2. A derrick as in claim 1, said bar being hingedly connected to the dual chock for vertical swinging movement and being provided with an upwardly opening socket at its outer free end in which the lower end of the first mentioned post is detachably received.

3. A derrick as in claim 1, said dual chock including a channel-shaped member having spaced downwardly and inwardly inclined bottom surfaces on which the bottom portion of the wheel is disposed, and outwardly and downwardly inclined end surfaces forming ramps over which the wheel is movable into engagement with said downwardly and inwardly inclined bottom surfaces.

4. A derrick as in claim 1, said boom being pivotally mounted at its inner end on the upper end of the second post for vertical swinging movement, and a diagonal brace detachably connected at one end to the second post and at its opposite end to the boom for supporting the boom at substantially a right angle to the second post.

5. A derrick as in claim 1, a wheel hook adapted to detachably engage around the bottom portion of a vehicle wheel disposed in alignment with the wheel engaged by said dual chock and around the portion thereof remote to the dual chock, a flexible guy member having one end rotatably connected to the upper end of the second post and a portion connected to said wheel hook, an adjustable gripping means connected to said guy member for retaining it under tension.

6. A derrick as in claim 1, an elongated rigid member detachably connected to one side of the dual chock and extending from one end thereof and disposed parallel to the dual chock, a foot member fixed to the under side of said last mentioned member at the end thereof remote to the dual chock and disposed at an acute angle thereto, and a wedge block having an upper wedge surface against which the foot member is frictionally engaged.

7. A derrick as in claim 6, and pawl and ratchet means detachably connected to said sleeve and to said second post for rotating the second post and boom on the sleeve.

8. A derrick as in claim 6, and pawl and ratchet means detachably connected to said sleeve and to said second post for rotating the second post and boom on the sleeve, said pawl and ratchet means including a pair of spring actuated holding pawls for holding the second post against rotation in either direction relatively to the first mentioned post and sleeve.

9. A derrick as in claim 6, and pawl and ratchet means detachably connected to said sleeve and to said second post for rotating the second post and boom on the sleeve, said pawl and ratchet means including a ratchet wheel keyed to the second post and a supporting arm fixed to the sleeve and projecting outwardly from beneath the ratchet wheel, a lever swingably mounted on said arm, and a spring urged dual pawl pivotally connected to said lever and having corresponding pawl ends selectively engageable with the ratchet wheel for turning said ratchet wheel in either direction when the lever is swung relatively to the supporting arm.

10. A derrick as in claim 6, and pawl and ratchet means detachably connected to said sleeve and to said second post for rotating the second post and boom on the sleeve, said pawl and ratchet means including a ratchet wheel keyed to the second post and a supporting arm fixed to the sleeve and projecting outwardly from beneath the ratchet wheel, a lever swingably mounted on said arm, and a spring urged dual pawl pivotally connected to said lever and having corresponding pawl ends selectively engageable with the ratchet wheel for turning said ratchet wheel in either direction when the lever is swung relatively to the supporting arm, a pair of holding pawls pivotally mounted on said supporting arm for engaging the ratchet wheel teeth and functioning to prevent rotation of the ratchet wheel in either direction, and an over center spring connected to each holding pawl for releasably holding either holding pawl in an operative position in engagement with the ratchet wheel or in an inoperative position out of engagement therewith.

FRANK T. SILA.

REFERENCES CITED

The following references are of record in the file of this patent:

UNITED STATES PATENTS

| Number | Name | Date |
|---|---|---|
| 242,124 | French | May 31, 1881 |
| 1,291,746 | Bradney et al. | Jan. 21, 1919 |
| 1,540,135 | Klinkhammer | June 2, 1925 |